3,470,162
3-TETRAHYDROPYRANYL ETHERS OF STE-
ROIDAL ALDOSTERONE ANTAGONISTS
John A. Edwards, Palo Alto, Calif., assignor to Syntex
Corporation, Panama, Panama, a corporation of
Panama
No Drawing. Filed Dec. 15, 1965, Ser. No. 514,113
Int. Cl. C07c 173/00, 173/20; A61k 27/00
U.S. Cl. 260—239.57                                    20 Claims

ABSTRACT OF THE DISCLOSURE

Tetrahydropyranyl ethers of steroidal aldosterone antagonists prepared by reduction of 3-keto-$\Delta^4$ to 3$\beta$-hydroxy-$\Delta^4$ and treatment thereof with dihydropyran.

---

This invention relates to novel cyclopentanophenanthrene derivatives and to their preparation.

More particularly, this invention relates to novel cyclopentanophenanthrene derivatives which are potent aldosterone antagonists and to their preparation. As aldosterone antagonists, the novel compounds of the present invention may be administered parenterally or orally as therapeutic agents for the control of hyperaldosteronism.

The novel compounds of the present invention may be characterized by the formula:

wherein R is selected from the group consisting of wherein:

$R^1$ is selected from the group consisting of sodium potassium and hydrogen;

$R^2$ is selected from the group consisting of an acylthio group containing 1 to 12 carbon atoms and hydrogen;

$R^3$ is selected from the group consisting of hydrogen and methyl;

$R^4$ is selected from the group consisting of hydrogen and methyl;

$R^5$ is selected from the group consisting of hydrogen and methyl;

$R^6$ is selected from the group consisting of beta hydrogen, beta hydroxyl and keto;

X is selected from the group consisting of hydrogen and fluorine, provided that X is hydrogen when $R^6$ is beta hydrogen;

$R^6$ and X taken together is selected from the group consisting of alpha oxido and beta oxido between carbon-9 and carbon-11; and Z is a single bond or a double bond between carbon 6 and carbon 7, provided that Z is a double bond only when $R^2$, $R^3$, $R^4$, X, and $R^6$ are hydrogen.

In the above formula, suitable acylthio groups include, for example, acetylthio, propionylthio, octanoylthio, butanoylthio, and the like, containing up to 12 carbon atoms. The wavy line ($\int$) indicates alpha and/or beta substituents.

The following is a digrammatic illustration of a process for the preparation of the novel compounds of the present invention. For the sake of simplicity, only the ring changed by the process for obtaining the novel compounds is shown; namely, ring A.

(I)        (II)        (III)

$R^4$ and $R^5$ have the same meaning as given hereinabove.

In practicing the process outlined above, the starting compound (I) is transformed into the corresponding 3$\beta$-hydroxy steroid (II) by treatment with, for example, lithium tri-tertiary butoxy aluminum hydride in a substantially anhydrous ether medium such as tetrahydrofuran, dioxane, and the like under reflux for a period of time of the order of 10 to 30 minutes or at ambient room temperature for a longer period of time of the order of 18 to 24 hours or more. Reduction of the 3-keto function to the 3$\beta$-hydroxy function may be accomplished in other ways such as, for example, by treatment with sodium borohydride in aqueous methanol, lithium aluminum hydride in tetrahydrofuran, or sodium borohydride in a methanol-tetrahydrofuran reaction medium. The preferred procedure is to employ lithium tri-tertiary butoxy aluminum hydride in anhydrous tetrahydrofuran.

The next step in accordance with the present invention is to transform the 3$\beta$-hydroxy steroid (II) into the corresponding 3$\beta$-tetrahydropyranyl ether steroid (III) which is accomplished by reaction of (II) with dihydropyran in the presence of a catalyst such as p-toluenesulfonyl chloride, methanesulfonyl chloride, benzenesulfonyl chloride, and the like. The reaction may be carried out in hydrocarbon solvent, if desired.

The following detailed examples are intended to illustrate the invention but not to limit the scope thereof.

Example 1

A solution of 50 ml. of anhydrous tetrahydrofuran, 3 g. of lithium tri-tertiary butoxy aluminum hydride, and 1 g. of 3 - (3-keto - 7$\alpha$ - acetylthio - 17$\beta$ - hydroxyandrost-4-ene-17$\alpha$-yl) propanoic acid lactone was refluxed for about 20 minutes. Thereafter, the reaction mixture was poured into ice-water and extracted several times with ethyl acetate. The extracts were combined, washed with water to neutrality, dried over anhydrous sodium sulfate, and evaporated to dryness under vacuum affording 3-(7$\alpha$-acetylthio - 3$\beta$,17$\beta$ - dihydroxyandrost - 4 - ene - 17$\alpha$ - yl) propanoic acid lactone.

A mixture of 1 g. of the above-prepared steroid, 20 ml. of dihydropyran, and 200 mg. of p-toluenesulfonyl chloride was allowed to stand at ambient temperature for about 24 hours. Thereafter, 2 ml. of pyridine were added and the mixture allowed to stand for about 10 minutes. Then, the reaction mixture was poured into dilute aqueous sodium bicarbonate solution and extracted several times with ethyl acetate. The extracts were combined, washed with water until neutral, and evaporated to dryness under vacuum affording 3-(3$\beta$-tetrahydropyranyloxy-7$\alpha$-acetylthio-17$\beta$-hydroxyandrost-4-ene-17$\alpha$-yl) propanoic acid lactone.

The product may be further purified, if desired, by fractional crystallization from, for example, pentane or by chromatography on neutral alumina eluting with hexane.

Example 1 may be schematically shown as follows:

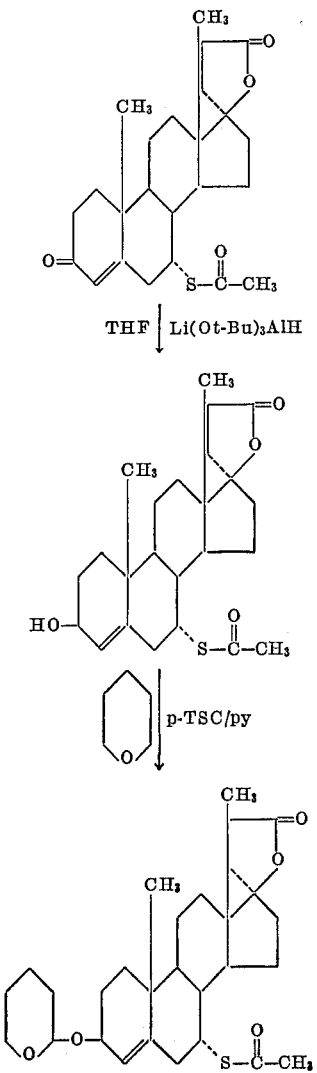

Example 2

3 - (3β - tetrahydropyranyloxy - 7α - octanoylthio - 17β-hydroxyandrost-4-ene-17α-yl) propanoic acid lactone was prepared from 3-(3-keto-7α-octanoylthio-17β-hydroxyandrost-4-ene-17α-yl) propanoic acid lactone using the procedure of Example 1.

Example 3

3 - (3β - tetrahydropyranyloxy - 17β - hydroxyandrosta-4,6-diene-17α-yl) propanoic acid lactone was prepared from the corresponding 3-(3-keto-17β-hydroxyandrosta-4,6-diene-17α-yl) propanoic acid lactone following the procedure of Example 1.

Example 4

3 - (3β - tetrahydropyranyloxy - 7α - pentanoylthio-17β-hydroxy - 19 - norandrost-4-ene-17α-yl) propanoic acid lactam was prepared from the corresponding 3-(3-keto-7α - pentanoylthio - 17-hydroxy-19-norandrost-4-ene-17α-yl) propanoic acid lactam in accordance with the procedure of Example 1.

Example 5

3 - (3 - keto - 2α - methyl - 17β - hydroxyandrost - 4-ene-17α-yl) propanoic acid lactone was treated in accordance with the method of Example 1 to obtain 3-(3β-tetrahydropyranyloxy - 2α - methyl-17β-hydroxyandrost-4-ene-17α-yl) propanoic acid lactone.

Example 6

3 - (3 - keto - 9α - fluoro - 11β,17β - dihydroxyandrost-4-ene-17α-yl) propanoic acid lactone; 3-(3-keto-9β,11β-epoxy-17β-hydroxyandrost-4-ene-17α-yl) propanoic acid lactone; 3-(3-keto-6α-methyl-17β-hydroxyandrost-4-ene-17α-yl) propanoic acid lactone; 3-(3-keto-9α-fluoro-2α-methyl - 11β,17β - dihydroxyandrost-4-ene-17α-yl) propanoic acid lactone and 3-(3,11-dioxo-9α-fluoro-2α-methyl-17β-hydroxyandrost-4-ene-17α-yl) propanoic acid lactone were each subjected to the process of Example 1 to obtain the corresponding 3β-tetrahydropyranyloxy compound.

Example 7

3-(3-keto-17β-hydroxyandrost-4-ene-17α-yl) propanoic acid lactone; 3-(3-keto-17β-hydroxyandrost-4-ene-17α-yl) 2-methyl propanoic acid lactone; 4-(3-keto-17β-hydroxy-7α-acetylthioandrost-4-ene-17α-yl) butyric acid lactone; 3 - (3-keto-17β-hydroxyandrost-4-ene-17α-yl) propanoic acid; 3-(3-keto-17β-hydroxyandrostene-4,6-diene-17α-yl) propanoic acid lactam; 3-(3-keto-7α-acetylthio-17β-hydroxy-19-norandrost-4-ene-17α-yl) propanoic acid; 3-(3-keto-17β-hydroxy-19-norandrosta-4,6-diene-17α-yl) propanoic acid lactam; 4-(3-keto-17β-hydroxy-7α-octanoyl-19-norandrost-4-ene-17α-yl)-butyric acid lactone; and 3-(3 - keto - 2α - methyl-17β-hydroxy-19-norandrost-4-ene-17α-yl) propanoic acid lactone were transformed to the corresponding 3β-tetrahydropyranyloxy compounds by the method of Example 1.

What is claimed is:
1. A compound of the formula

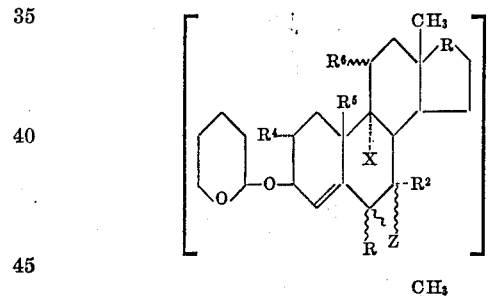

wherein R is selected from the group consisting of

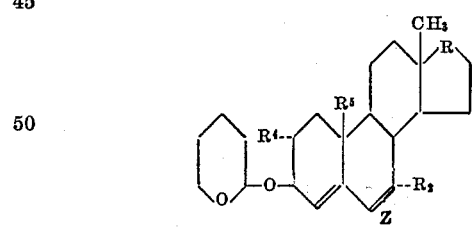

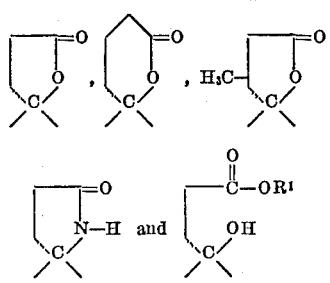

wherein
$R^1$ is selected from the group consisting of sodium, potassium and hydrogen;
$R^2$ is selected from the group consisting of an acylthio group containing 1 to 12 carbon atoms and hydrogen;
$R^4$ is selected from the group consisting of hydrogen and methyl;

$R^5$ is selected from the group consisting of hydrogen and methyl; and

Z is a single bond or double bond between carbon 6 and carbon 7, provided that Z is a double bond only when $R^2$ and $R^4$ are each hydrogen.

2. A compound according to claim 1 wherein Z is a single bond between carbon 6 and carbon 7 and $R^4$ is hydrogen.

3. A compound according to claim 2 wherein R is

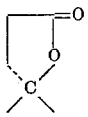

4. A compound according to claim 3 wherein $R^2$ is acetylthio and $R^5$ is methyl.

5. A compound according to claim 3 wherein $R^2$ is acetylthio and $R^5$ is hydrogen.

6. A compound according to claim 3 wherein $R^2$ is octanoylthio and $R^5$ is methyl.

7. A compound according to claim 3 wherein $R^2$ is octanoylthio and $R^5$ is hydrogen.

8. A compound according to claim 3 wherein $R^2$ is hydrogen.

9. A compound according to claim 1 wherein R is

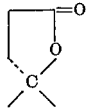

10. A compound according to claim 9 wherein Z is a single bond between carbon 6 and carbon 7 and $R^2$ is hydrogen.

11. A compound according to claim 10 wherein $R^4$ and $R^5$ are each methyl.

12. A compound according to claim 10 wherein $R^5$ is methyl and $R^4$ is hydrogen.

13. A compound according to claim 1 wherein R is

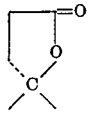

and Z is a double bond between carbon 6 and carbon 7.

14. A compound according to claim 13 wherein $R^5$ is methyl.

15. A compound of the formula

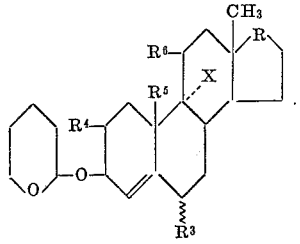

wherein R is selected from the group consisting of

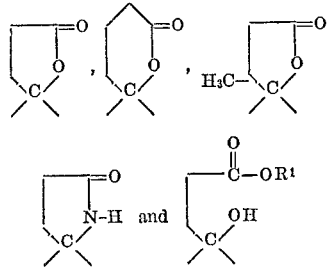

wherein
$R^1$ is selected from the group consisting of sodium, potassium and hydrogen;

$R^3$ is selected from the group consisting of hydrogen and methyl;

$R^4$ is selected from the group consisting of hydrogen and methyl;

$R^5$ is selected from the group consisting of hydrogen and methyl;

$R^6$ is selected from the group consisting of beta hydroxyl and keto;

X is fluorine;

$R^6$ and X taken together is selected from the group consisting of alpha oxido and beta oxido between carbon 9 and carbon 11, with the proviso that when $R^6$ and X together are other than oxido, $R^4$ is methyl when $R^3$ is hydrogen.

16. A compound according to claim 15 wherein X is fluorine, $R^5$ is methyl and R is

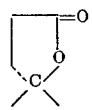

17. A compound according to claim 16 wherein $R^6$ is beta hydroxyl.

18. A compound according to claim 17 wherein $R^4$ is methyl.

19. A compound according to claim 16 wherein $R^4$ is methyl and $R^6$ is keto.

20. A compound according to claim 15 wherein X and $R^6$ taken together is a member selected from the group consisting of alpha oxido and beta oxido between carbon 9 and carbon 11 and R is

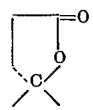

References Cited

UNITED STATES PATENTS

| | | | |
|---|---|---|---|
| 3,013,012 | 12/1961 | Cella et al. | 260—239.57 |
| 3,338,925 | 8/1967 | Fried | 260—397.4 |

FOREIGN PATENTS

| | | |
|---|---|---|
| 889,309 | 2/1962 | Great Britain. |
| 889,311 | 2/1962 | Great Britain. |

OTHER REFERENCES

Patchett et al. Journ. Org. Chem., 27, November 1962, pp. 3822–3828.

Atwater et al., Journ. Org. Chem., 26, September 1961, pp. 3077–3083.

Cella et al., Journ. Org. Chem., 24, August 1959, pp. 1109–1110.

LEWIS GOTTS, Primary Examiner

ETHEL G. LOVE, Assistant Examiner

U.S. Cl. X.R.

260—239.55, 999

UNITED STATES PATENT OFFICE
CERTIFICATE OF CORRECTION

Patent No. 3,470,162                              Dated September 30, 1969

Inventor(s) John A. Edwards

It is certified that error appears in the above-identified patent and that said Letters Patent are hereby corrected as shown below:

Column 1, lines 30 to 40, that portion of the formula reading:

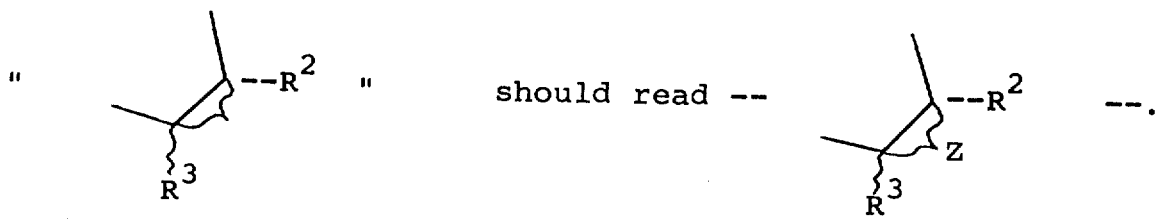

Column 1, line 54, a --,-- should appear after "sodium".
Column 2, line 8, "digrammatic" should read -- diagrammatic --
Column 4, lines 35 to 45, the formula:

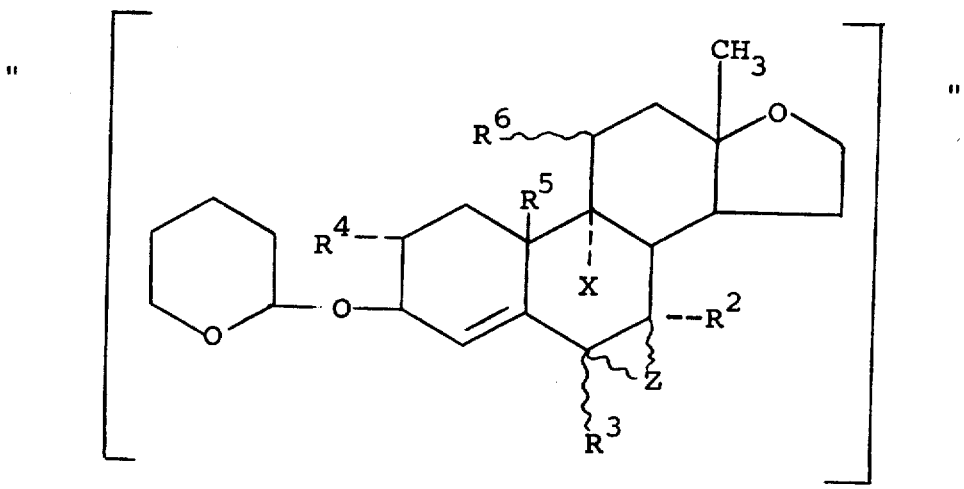

should not appear.

(SEAL)
Attest:

Edward M. Fletcher, Jr.
Attesting Officer

SIGNED AND
SEALED
AUG 4 - 1970

WILLIAM E. SCHUYLER, JR.
Commissioner of Patents